(12) United States Patent
Liu et al.

(10) Patent No.: US 8,722,163 B2
(45) Date of Patent: May 13, 2014

(54) RECYCLABLE COLORANTS IN PLASTIC BEVERAGE CONTAINERS

(75) Inventors: Wei Liu, Pittsburgh, PA (US); Lee M. Nicholson, Katonah, NY (US); Frank Schloss, Holland, OH (US); Jason Haslow, Holland, OH (US)

(73) Assignee: PepsiCo, Inc., Purchase, NY (US)

( * ) Notice: Subject to any disclaimer, the term of this patent is extended or adjusted under 35 U.S.C. 154(b) by 119 days.

(21) Appl. No.: 13/234,909

(22) Filed: Sep. 16, 2011

(65) Prior Publication Data

US 2013/0071592 A1    Mar. 21, 2013

(51) Int. Cl.
*B32B 1/02* (2006.01)
*B32B 1/08* (2006.01)

(52) U.S. Cl.
USPC ....... 428/35.7; 428/34.1; 428/34.2; 428/35.9; 428/36.9

(58) Field of Classification Search
USPC .................. 428/34.1, 34.2, 35.7, 35.9, 36.9
See application file for complete search history.

(56) References Cited

U.S. PATENT DOCUMENTS

| | | |
|---|---|---|
| 3,773,535 A | 11/1973 | Burgyan et al. |
| 3,915,884 A | 10/1975 | Kazenas |
| 4,167,506 A | 9/1979 | Shimada et al. |
| 4,452,720 A | 6/1984 | Harada et al. |
| 4,482,586 A | 11/1984 | Smith et al. |
| 5,143,308 A | 9/1992 | Hally et al. |
| 5,314,072 A | 5/1994 | Frankel et al. |
| 5,464,106 A | 11/1995 | Slat et al. |
| 5,504,121 A | 4/1996 | West |
| 6,096,822 A | 8/2000 | Seven et al. |
| 6,437,022 B1 | 8/2002 | Yoshihara |
| 6,518,322 B1 | 2/2003 | West |
| 2001/0004645 A1 | 6/2001 | Robinson et al. |
| 2002/0011694 A1 | 1/2002 | Nichols et al. |
| 2002/0115749 A1 | 8/2002 | Khait |
| 2003/0050203 A1 | 3/2003 | Herdt et al. |
| 2003/0084820 A1 | 5/2003 | Okamoto et al. |
| 2003/0155063 A1 | 8/2003 | Ishiwatari et al. |
| 2003/0194578 A1 | 10/2003 | Tam et al. |

(Continued)

FOREIGN PATENT DOCUMENTS

| | | | |
|---|---|---|---|
| FR | 2224504 A1 | 10/1974 | |
| JP | 11226944 A | 8/1999 | |

(Continued)

OTHER PUBLICATIONS

International Search Report for PCT/US2012/055328 mailed Jan. 14, 2013.

(Continued)

Primary Examiner — Marc Patterson
(74) Attorney, Agent, or Firm — Banner & Witcoff, Ltd.

(57) ABSTRACT

A thermoplastic article includes one or more recyclable-friendly synthetic coloring pigments. The pigment has a melting temperature that is about 20 to about 50° C. higher than that of the base polymer. This enables the pigment to remain predominately intact (e.g., unmelted) during injection molding and act as a colorant in the preform and resulting blow molded container. When the container is remelted during subsequent processing, such as post-consumer recycling, the pigment melts and transesterifies into the base polymer. Thus, upon such further processing, the pigment effectively is subsumed into the base polymer and does not affect the basic characteristics and properties of the base polymer.

18 Claims, 5 Drawing Sheets

(56) References Cited

U.S. PATENT DOCUMENTS

| | | |
|---|---|---|
| 2004/0082672 A1 | 4/2004 | Zeng et al. |
| 2004/0155374 A1 | 8/2004 | Hutchinson et al. |
| 2005/0038189 A1 | 2/2005 | Takimoto et al. |
| 2005/0051050 A1 | 3/2005 | Bindra |
| 2005/0175801 A1 | 8/2005 | Yamane et al. |
| 2005/0176881 A1 | 8/2005 | Bheda et al. |
| 2005/0187306 A1 | 8/2005 | Kulkarni |
| 2005/0203196 A1 | 9/2005 | Hasegawa et al. |
| 2005/0211132 A1 | 9/2005 | Sprogar et al. |
| 2005/0260369 A1 | 11/2005 | Graf et al. |
| 2006/0051539 A1 | 3/2006 | Yamasaki et al. |
| 2006/0074136 A1 | 4/2006 | Smith et al. |
| 2006/0189716 A1 | 8/2006 | Ushirogouchi et al. |
| 2006/0263553 A1 | 11/2006 | Yamada et al. |
| 2007/0092672 A1 | 4/2007 | Colhoun et al. |
| 2008/0009574 A1 | 1/2008 | Huenefeld et al. |
| 2008/0058495 A1 | 3/2008 | Quillen et al. |
| 2008/0153962 A1 | 6/2008 | Xia et al. |
| 2009/0131626 A1 | 5/2009 | Sheppard et al. |
| 2009/0181196 A1 | 7/2009 | Pecorini et al. |
| 2010/0113626 A1 | 5/2010 | Liu |
| 2010/0152309 A1 | 6/2010 | Booth et al. |

FOREIGN PATENT DOCUMENTS

| | | |
|---|---|---|
| JP | 2001302893 A * | 10/2001 |
| WO | 00/73752 A1 | 12/2000 |
| WO | 2005/054351 A1 | 6/2005 |
| WO | 2009/152114 A1 | 12/2009 |
| WO | 2010/017406 A1 | 2/2010 |
| WO | 2010/017406 A9 | 4/2010 |
| WO | 2010/086346 A1 | 8/2010 |

OTHER PUBLICATIONS

Database WPI, Week 199944, Thomson Scientific, London, GB; AN 1999-521764.

* cited by examiner

RECYCLABLE COLORANTS IN PLASTIC BEVERAGE CONTAINERS

BACKGROUND

Current polyethylene terephthalate (PET) containers typically are clear or uniformly shaded with minimum amount of color (color-pigments, effects pigments, dyes, or the like). One issue that has been encountered is that coloring pigments and dyes used in the manufacture of PET beverage bottles often are not recycle-friendly, e.g., inclusion of such coloring pigments and dyes in the high-value clear recycle stream is not possible. As a result, recyclers often need to collect colored containers separately and sell them at a much lower cost.

Some techniques have been developed for removing pigments and other contaminants from PET to facilitate recycling. For example, West U.S. Pat. No. 5,504,421 discloses a method of decontaminating PET by transesterifying the material to form embrittled PET, crushing the mixture and separating uncrushed material containing PET, followed by esterifying the material to form short-chain PET polymers. Such methods, which introduce considerable complexity and expense to the recycling process, are not economically feasible.

It would be desirable to make containers, such as PET beverage containers, with improved visual characteristics, especially such containers that may be subsequently recycled in existing recycling streams with no or minimal additional processing steps.

SUMMARY

In one aspect, preforms used to prepare thermoplastic containers have one or more recycle-friendly pigments comprising synthetic organic materials. The preform comprises a base polymer and at least one pigment having a melting temperature about 20 to about 50° C. higher than that of the base polymer. During injection molding, the pigment remains intact (e.g., unmelted), thereby acting as a colorant for the preform as well as the container that is subsequently blow molded from the preform. When the container is remelted during subsequent processing, such as post-consumer recycling, the pigment melts and transesterifies into the base polymer. Thus, upon such further processing, the pigment effectively is subsumed into the base polymer and does not affect the basic characteristics and properties of the base polymer.

The pigments are compatible with the base polymer, both in terms of polymer processing as well as during subsequent recycling of the molded containers. The pigments also should capable of being ground to particle sizes less than about 150 μm to provide good dispersion in the base polymer and the ability to achieve the desired visual effects. In some examples, the pigments may be chemically similar to the base polymer or the monomers from which the base polymer is formed, for example, high melting point PET fines, PET co-monomers, and/or reactants or byproducts of PET polymerization.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Figure 1:
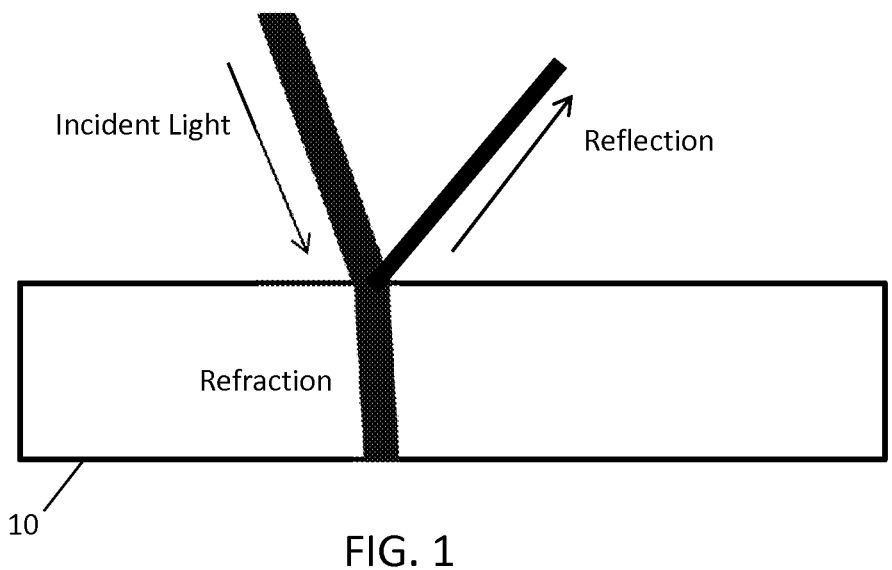
FIG. 1 is a schematic illustration of light transmission through a transparent thermoplastic substrate.

The invention is described primarily with reference to preparing injection-molded preforms, which are blow-molded into beverage containers. It should be recognized, however, that the techniques described herein may be used in the preparation of other types of containers, such as jars, tubs, trays, or bottles for holding foodstuffs or liquid. A variety of thermoplastic materials may be used as the base polymer, either alone or in blends with other thermoplastic materials. Non-limiting examples of base polymers include thermoplastic polyesters such as polyethylene terephthalate (PET), polyethylene 2,6- and 1,5-naphthalate (PEN), PETG, polytetramethylene 1,2-dioxybenzoate, and copolymers of ethylene terephthalate and ethylene isophthalate. Of these, PET is most commonly used. The polymeric materials may include, in whole or in part, virgin polyester, recycled polyester, and/or co-polyesters, with or without conventional additives such as mold release agents and the like.

In general, articles may be prepared by injection molding a polymer melt stream into a defined shape. Preforms for containers typically are injection-molded from a polymer melt stream into a shape similar to a test tube. The preform subsequently may be stretched and blow-molded to form a container using well known techniques, the particulars of which form no part of the present invention.

The thermoplastic material contains a base polymer and at least one pigment dispersed therein to provide a uniform or non-uniform (e.g., patterned) color. In some embodiments, mono-layer preforms and containers are prepared, while in other embodiments one or more additional layers also may be present, such as additional polymeric layers for coloring or aesthetic purposes and/or functional layers, e.g., gas barrier layers or the like. The pigment may be dry blended with the base polymer prior to melt processing or, alternatively, may be introduced into the polymer melt during injection molding.

The thermoplastic beverage containers described herein include one or more recyclable-friendly synthetic pigments, such that the container may be processed in existing recycling streams, such as mechanical PET recycling streams. Non-limiting examples of suitable pigments include, but not limited to, high melting point PET fines; PET comonomers; reactants or byproducts of PET polymerization; polyethylene naphthalate (PEN); terephthalic acid (TPA or PTA); bis(hydroxyethyl) terephthalate (BHET); dimethyl terephthalate (DMT); dimethyl-2,6 naphthalenedicarboxylate (NDC); and isophthalic acid (IPA).

Pigments may be selected in accordance with a number of considerations. First, the material should have a melting temperature which is about 20 to about 50° C., often from about 25 to about 45° C. or from about 30 to 35° C., higher than that of the base polymer. This way, the pigment remains primarily intact (unmelted) while the base polymer undergoes injection molding. This enables the material to act as a pigment to introduce color, shading, and/or other visual effects to the preform and resulting molded container.

The pigment also should be compatible with recycling streams for the base polymer. During the recycling process, containers are typically ground and reduced to "flakes." In some cases, the flakes can be re-extruded into pellets to be blended together with virgin polymer and molded into articles. These subsequent melting stages will eventually melt the remaining higher-melting pigment particles as a result of the longer melt residence times and high temperature sheer rates encountered during this processing, such that the polymeric material is achromatized. The pigment also should not adversely affect other properties of the material needed for recycling, such as degrading drying properties, forming haze, significantly lowering intrinsic viscosity (I.V.), or significantly altering the natural stretch properties of the base polymer. The recycle friendliness of the dye/pigment can be confirmed by subjecting the dye/pigment-containing polymer to a series of industry standard tests that are designed to evaluate the recycle-friendliness of an additive through a process of subjecting the recycled PET to a series of additional melt heat histories. This will evaluate the dye/pigment's impact on the resulting recycled PET's color, rate of IV build on solid stating, loss of IV on molding, effect on stretching properties when blowing bottles as well as evaluate numerous other physical performance attributes. These recyclability tests may be used to determine whether a particular dye or pigment can be designated as recycle-friendly to the PET recycle stream.

As an alternative to melting the pigments, during recycling the containers may be achromatized by separating the pigments using other well-known techniques, such as extraction or the like.

The pigments should be selected such that particles can be ground to particle sizes less than about 150 µm, especially about 100 µm or less. For example, typical mean particle size of the pigment may range from about 1 to about 140 µm, from about 1 to about 120 µm, from about 1 to about 90 µm, from about 5 to about 75 µm, or from about 10 to about 60 µm. Such particle sizes enable the pigment to be easily dispersed in the base polymer during compounding or dry blending, and may be selected to achieve the desired visual effects as discussed more fully below.

In some embodiments, the pigment(s) is uniformly dispersed in the base polymer to create uniform color or shading. In other embodiments, the pigment(s) may be dispersed non-uniformly in the base polymer to create geometric or non-geometric patterns, e.g., stripes, swirls, or the like, in the preform and container. The amount of pigment used may vary over a wide range depending on such factors as the properties of the pigment and the extent of coloration/shading desired. By way of example and without limitation, the total pigment concentration may range from about 0.0001 to about 5 wt. %, from about 0.001 to about 3 wt. %, from about 0.005 to about 2 wt. %, or from about 0.01 to about 1 wt. %, based on the total weight of the polymer composition.

Figure 2:
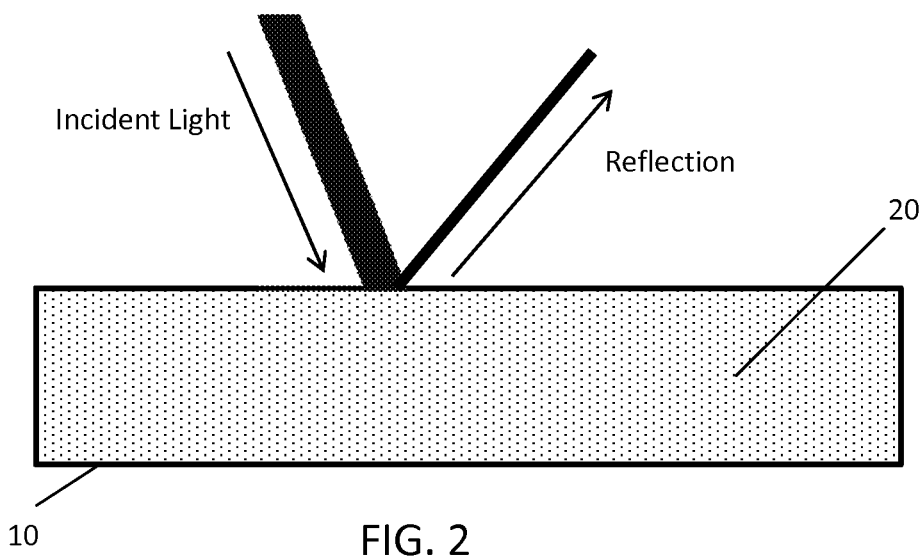
FIG. 2 is a schematic illustration of light absorption in a thermoplastic substrate having pigment particles dispersed therein in accordance with certain aspects of the present invention.

Pigment particle size, particle shape, and concentration may be appropriately selected to achieve the desired color, shading, and/or other visual effects. The visual effect of the pigment may be expressed in terms of index of refraction. A substance which has a higher refractive index impedes the velocity of light (or offers more resistance to it), and thus a larger proportion of the light is reflected. FIG. 1 schematically illustrates light transmission through a transparent PET substrate (1). FIG. 2 schematically illustrates light absorption in a PET substrate (1) having pigment particles (20) dispersed therein. Depending on the pigment selected, the amount of light reflected in the case of the pigment-containing substrate (FIG. 2) is less than that of transparent PET substrate (FIG. 1). The wavelength of the reflected light determines the color that appears to the eye.

The amount of refraction is the measure of impediment given by a substance to a beam of light. The amount light is refracted is dependent upon a number of factors, such as the temperature of the substrate and the wavelength of the light. The ratio of the velocity of light in air to the velocity of light in another substance may be expressed as the index of refraction or refractive index, and can be measured by the angle at which the ray of light is bent. Refractive index is determined by measuring the angle of incidence ("i"), i.e., the angle between a ray of light entering the substance and a line perpendicular to its surface, and the angle of refraction ("r"), i.e., the angle between the refracted ray and the perpendicular to the surface. The refractive index N is expressed as:

$$N = \sin i / \sin r$$

The refractive index of the pigments described herein may vary over a wide range depending on such factors as the type of pigment, color, etc. By way of example and without limitation, the refractive index of the pigment may range from about 1.4 to about 2.5, from about 1.5 to about 2.3, or from about 1.7 to about 2.0.

The refractive index of a pigment particle is not necessarily the same in all directions. Pigments typically are in the form of crystals having definite shapes and can be classified into different systems. In cubic crystals, for example, light travels at the same speed in all directions within the crystal, which is said to be isotropic. Other types of crystals, in which light does not travel at the same speed in all directions, are characterized as anisotropic. Anisotropic substances may be uniaxial, having two refractive indices (tetragonal and hexagonal), or biaxial, having three refractive indices (triclinic, monoclinic and orthorhombic). Table I below lists properties of several synthetic organic pigments that may be used, depending on the composition and properties of the base polymer used.

TABLE I

| Pigment | Mean Particle Size (µm) | Particle shape | Melting Temp. (° C.) |
|---|---|---|---|
| PET Fines | 25-75 | Triclinic | ~275 |
| Terephthalic acid | 40-80 | Triclinic | ~300 |
| Dimethyl terephthalate | 30-65 | Rhomboidal | ~142 |
| Isophthalic acid | 40-75 | Monoclinic | ~340 |

The pigment materials in general should be compatible with the base polymer, both in terms of polymer processing as well as during subsequent recycling or other post-processing of the molded containers. In some cases, the pigment may undergo some degree of transesterification into the base polymer (e.g., isophthalic acid may partially transesterify into PET), which may result in lowering of molecular weight somewhat. Such effects should be kept to a minimum to avoid undue degradation of the base polymer. When the containers are intended for contact with foodstuffs, the pigments also should meet existing regulatory food contact guidelines for plastic packaging additives.

The pigments generally have melting temperatures from about 20 to about 50° C. higher than that of the base polymer, often from about 25 to about 30° C. higher than that of the base polymer. The particular melting temperature of the pigment may be selected depending on such factors as the injection temperature of base polymer, which typically is somewhat higher than the melting temperature of the base polymer to ensure complete melting. For example, the pigment should not melt or degrade when processed at the injection temperature of the base polymer. In some cases a somewhat greater differential in melting temperature (>20° C.) may be needed, e.g., to accommodate a higher-than-normal injection temperature.

In some aspects of the present invention, the pigments are selected to be chemically similar to the base polymer and/or the monomers from which the polymer is formed, so that during subsequent recycling or other processing of the container, the pigment is able to combine with the base polymer in a manner that essentially forms a homogeneous, pigment-free material, without the need of introducing an additional extraction step to remove colorants. For example, when the base polymer is PET, the pigment may be selected to be high-melting temperature PET fines or PET co-monomers, such as terephthalic acid. When the container is heated above the melting temperatures of both the base polymer and the pigment, the pigment molecules may transesterify into PET or otherwise chemically combine with the base polymer to form a homogenous polymer.

EXAMPLES

The following examples are provided for illustrative purposes and should not be regarded as limiting the scope of the present invention.

Example 1

This example illustrates incorporating polyethylene naphthalate (PEN) fines into a polyethylene terephthalate (PET) base polymer. PEN homo-polymer was frozen using liquid nitrogen, then ground using a 0.5 mm screen, applying 0.5-1 lb./hr. The material was dried overnight at 120° C. in a vacuum oven, followed by 6 hours in a desiccant bed. The resulting PEN course powder had the consistency of find sand.

The PEN powder was blended with Invista 1101 PET at loadings of 1%, 2%, and 5% (w/w). The PEN powder also was blended with Wellman HP807 PET at loadings of 2%, 5%, and 7.5% (w/w). Standard weight bottle preforms were injection molded at injection temperatures of 268° C. (Invista 1101) and 255° C. (Wellman HP807). Balloons were then free-blown at conditions of 60-65 psi and about 95-100° C.

Figure 3:
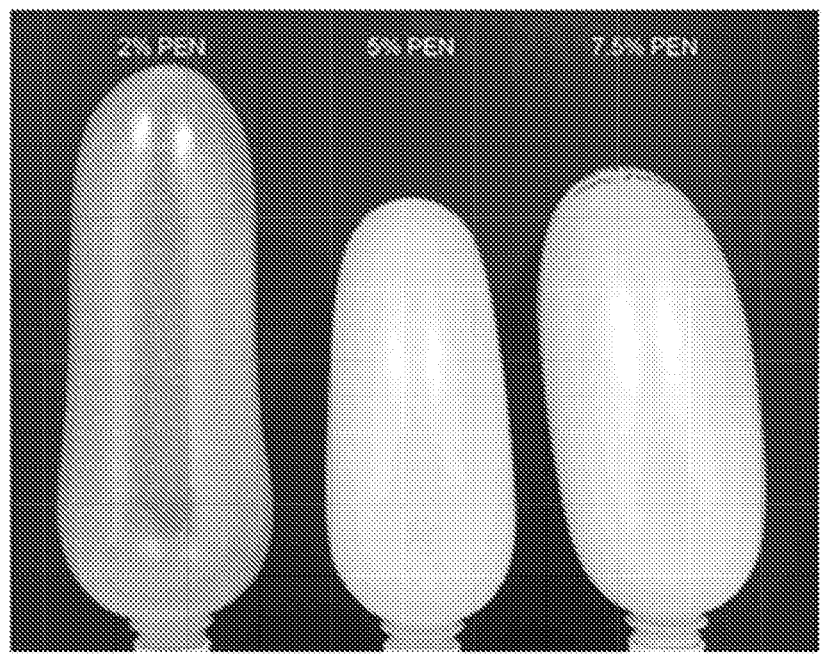
FIG. 3 shows free-blow PET balloons containing PEN at loadings of 2%, 5%, and 7.5% (w/w).
Figure 4:
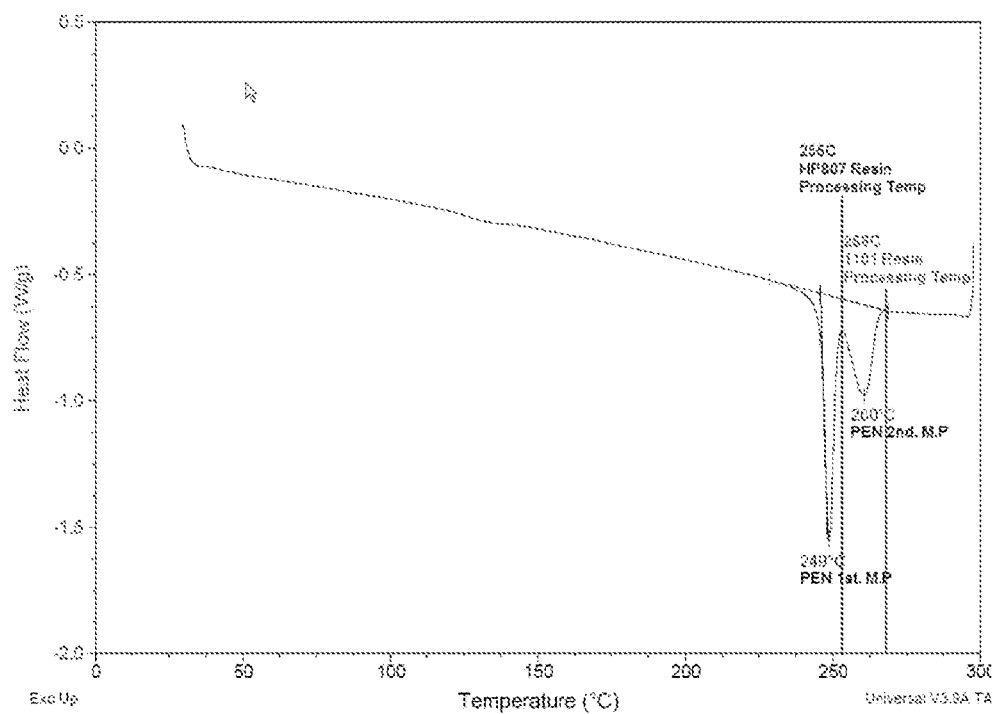
FIG. 4 is a differential scanning calorimetry (DSC) graph for PEN fines.

FIG. 3 shows balloons that were free-blown from compositions containing PEN at loadings of 2%, 5%, and 7.5% (w/w). As can be seen in FIG. 3, at each of these loadings, PEN was effective for introducing white coloration to the molded container. FIG. 4 shows the DSC graph for the PEN fines. When processed with the two PET polymers identified above, the PEN fines melted more than desired and also exhibited compatibility issues.

Example 2

This example illustrates incorporating terephthalic acid (TPA) powder into a PET polymer. TPA fine powder (Sigma-Aldrich) was vacuum dried overnight at 100° C. in a vacuum oven. The TPA powder was then blended with Wellman HP807 PET at loadings of 0.5%, 1%, 2%, and 5% (w/w). The TPA powder had the effect of reducing intrinsic viscosity of the PET resin, as summarized in Table II below.

TABLE II

| TPA (wt. %) | IV (dL/g) |
| --- | --- |
| 0 | 0.67 |
| 0.5 | 0.5 |
| 1 | 0.46 |
| 5 | 0.36 |

Figure 5:
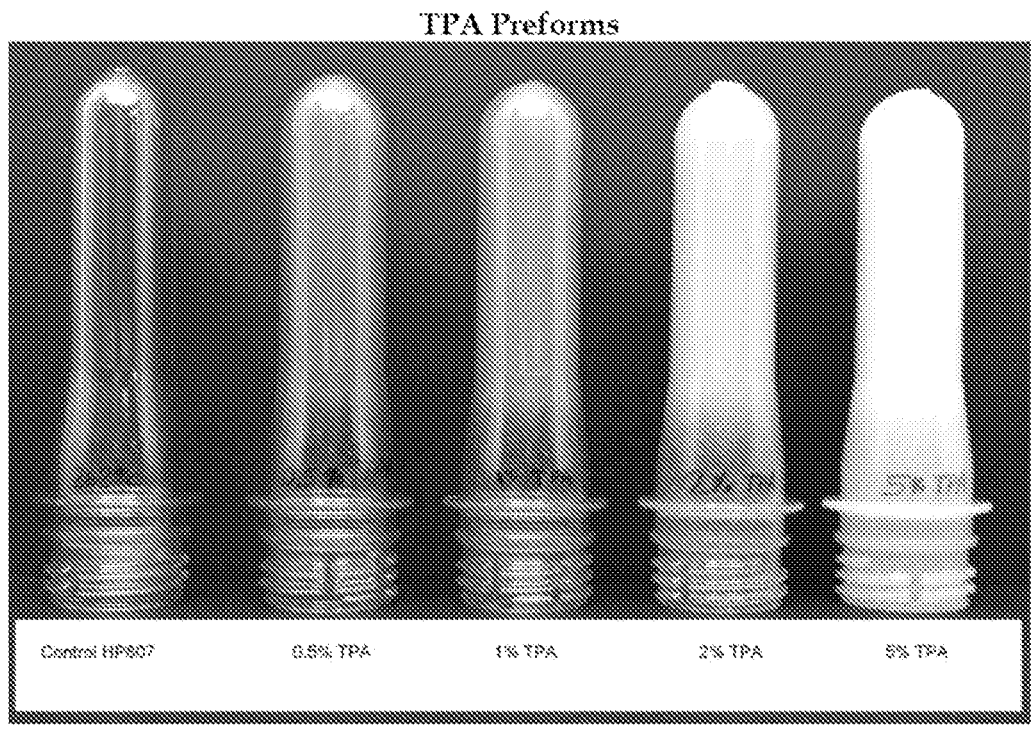
FIG. 5 shows PET preforms containing TPA at loadings of 0%, 0.5%, 1%, 2%, and 5% (w/w).

Standard weight bottle preforms were injection molded at an injection temperature of 262° C. The preforms are shown in FIG. 5 together with a control preform that was prepared from the PET resin without adding TPA. In general, the TPA was found to cause degradation of the PET polymer (note IV reduction above) and also functioned as a nucleant, causing crystallization during injection molding that can be seen by the white appearance in FIG. 5.

Figure 6:
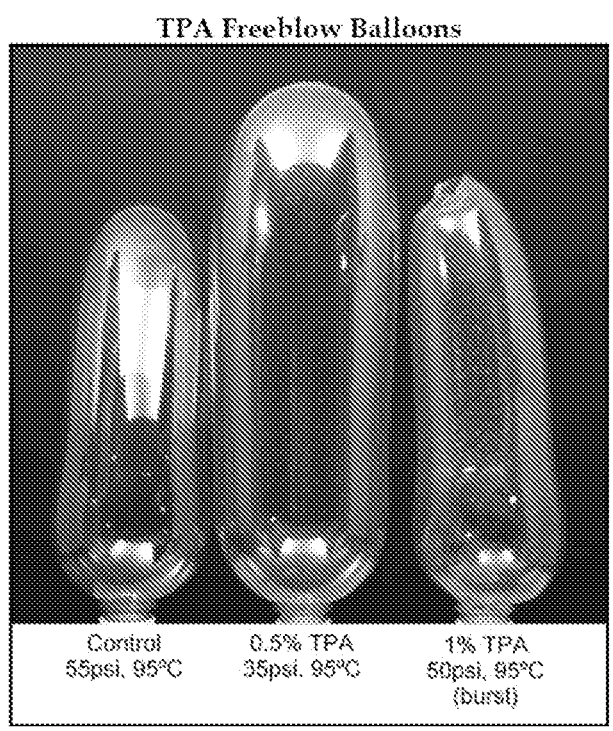
FIG. 6 shows free-blow PET balloons containing TPA at loadings of 0%, 0.5%, and 1% (w/w).

Balloons were prepared by free-blowing the preforms at conditions of 35-55 psi and about 95° C. FIG. 6 shows balloons that were free-blown from compositions containing TPA at loadings of 0%, 0.5%, and 1% (w/w). As shown in FIG. 6, at loadings of 1% and higher, the balloons burst under these conditions.

Example 3

Figure 8:
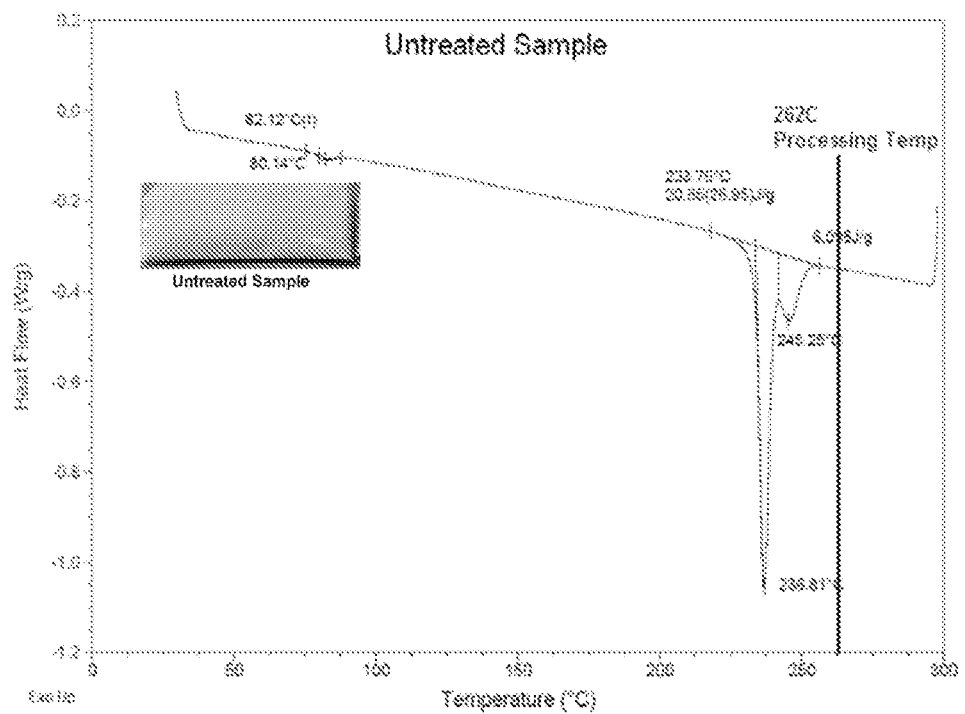
FIG. 8 is a DSC graph for untreated PET fines.

This example illustrates incorporating high melting PET fines into a PET polymer. Virgin PET (Invista 1101) having an average particle size of about 350-500 μm was ground to an average particle size of about 100 μm. The material had melting temperatures of 237° C. and 245° C. The DSC of the untreated PET fines is depicted in FIG. 8.

Figure 9:
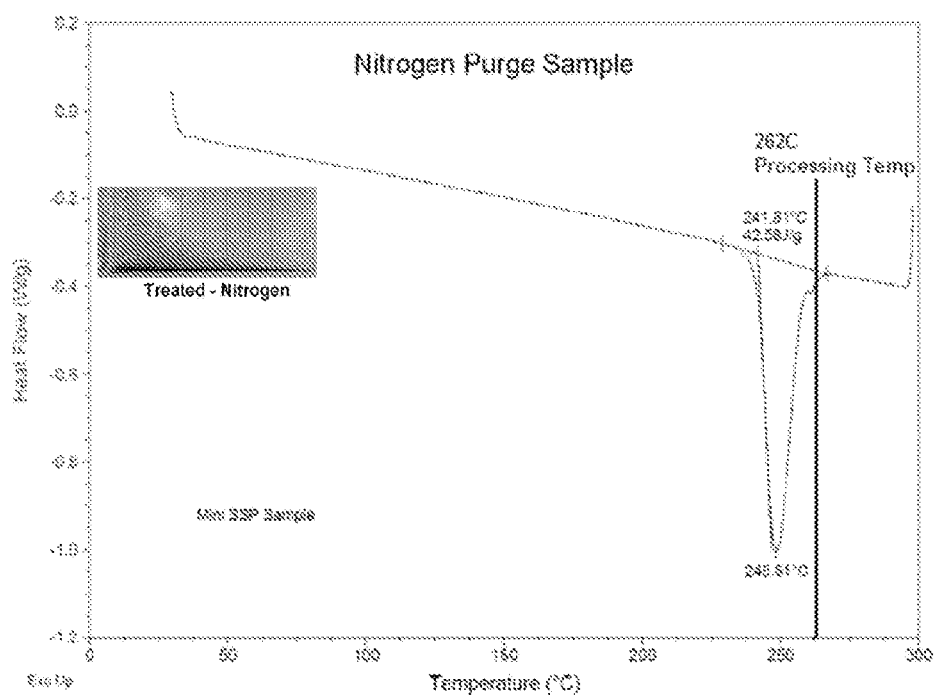
FIG. 9 is a DSC graph for PET fines heat treated with a nitrogen purge stream.

A portion of the PET fines was annealed by heating in a reaction vessel with nitrogen purge flow, beginning at 410° F. and increasing to 435° F. over three days, and holding at 435° F. for two weeks. The DSC of the nitrogen-treated PET fines is depicted in FIG. 9. The nitrogen-treated PET fines had a melting temperature of 248° C. and were severely yellowed (and discarded).

Figure 10:
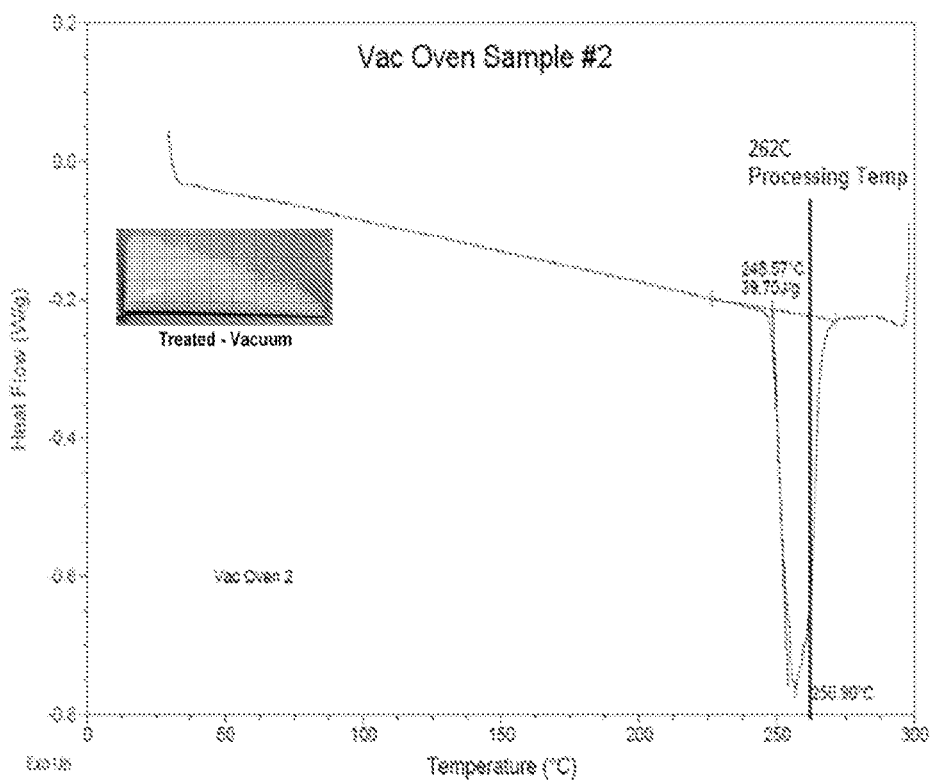
FIG. 10 is a DSC graph for PET fines heat treated in a vacuum oven.

Another portion of the PET fines was annealed by heating in a vacuum oven at 410° F. for two weeks. The DSC of the vacuum oven treated PET fines is depicted in FIG. 10. The vacuum oven-treated PET fines had a melting temperature of 254° C. and were white in color with only slight discoloration.

Figure 7:
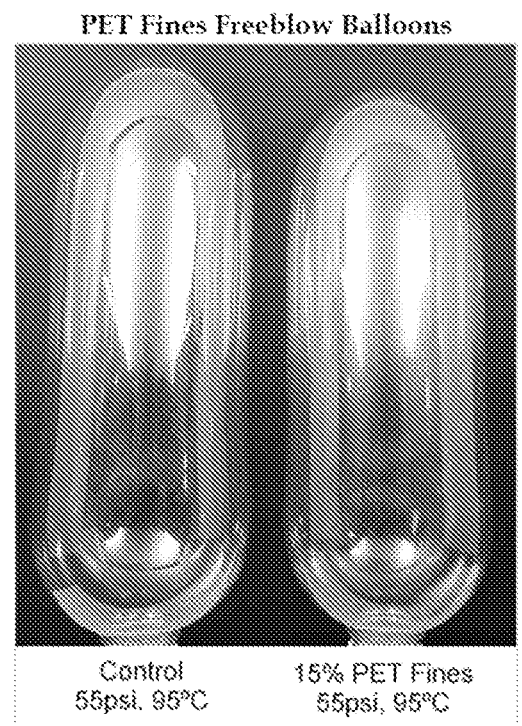
FIG. 7 shows free-blow PET balloons containing PET fines at loadings of 0% and 15% (w/w).

The vacuum-treated PET fines were blended with Wellman HP807 PET at loadings of 0% (control) and 15% (w/w). Standard weight bottle preforms were injection molded at an injection temperature of 262° C. Balloons were prepared by free-blowing the preforms at conditions of 55 psi and about 95° C. FIG. 7 shows balloons that were free-blown from compositions containing PET fines at loadings of 0% (control) and 15% (w/w).

The PET fines were compatible with the PET base polymer, and the resulting blow molded container had an appearance very similar to the control PET container (FIG. 7). The melting temperature of the PET fines used in this experiment was too low to remain unmelted during injection molding, so the PET fines did not result in a pigmentation effect.

Discussion

Based on the trials completed, it appears that organic materials most effective for use as pigments for PET base polymers should having a melting temperature of about 280° to 300° C., should be compatible with PET, and should have the ability to be ground to particle sizes of less than about 150 μm.

The foregoing description should be considered illustrative rather than limiting. It should be recognized that various modifications can be made without departing from the spirit or scope of the invention as described and claimed herein.

What is claimed:

1. A preform prepared from a thermoplastic material comprising:
   a base polymer having a first melting temperature; and
   at least one pigment comprising a monomeric or polymeric material compatible with the base polymer and having a melting temperature about 20 to about 50° C. higher than that of the base polymer; wherein the pigment provides at least one of color and shading to the preform and is capable of undergoing transesterification into the base polymer during subsequent processing wherein the pigment is selected from the group consisting of polyethylene terephthalate (PET) fines, PET comonomers, reactants or byproducts of PET polymerization, polyethylene naphthalate (PEN), terephthalic acid (TA), bis(hydroyxethyl) terephthalate (BHET), dimethyl terephthalate (DMT), dimethyl-2,6naphthalenedicarboxylate (NDC), isophthalic acid (IPA) and combinations thereof.

2. The preform of claim 1, wherein the base polymer comprises a polyester.

3. The preform of claim 2, wherein the base polymer is selected from the group consisting of polyethylene terephthalate (PET), polyethylene 2,6- and 1,5-naphthalate (PEN), PETG, polytetramethylene 1,2-dioxybenzoate, copolymers of ethylene terephthalate and ethylene isophthalate, and combinations thereof 4. The preform of claim 3, wherein the base polymer comprises polyethylene terephthalate.

5. The preform of claim 1, wherein pigment has a mean particle size less than about 100 μm.

6. The preform of claim 5, wherein the mean particle size ranges from about 1 to about 90 μm.

7. The preform of claim 6, wherein the mean particle size ranges from about 5 to about 75 μm.

8. The preform of claim 7, wherein the mean particle size ranges from about 10 to about 60 μm.

9. The preform of claim 1, wherein the pigment has a melting temperature which is about 25 to about 45° C. higher than that of the base polymer.

10. The preform of claim 1, wherein the amount of pigment ranges from about 0.0001 to about 5 wt. %, based on the total weight of the thermoplastic material.

11. The preform of claim 10, wherein the amount of pigment ranges from about 0.001 to about 3 wt. %, based on the total weight of the thermoplastic material.

12. The preform of claim 1, wherein the pigment has a refractive index which ranges from about 1.4 to about 2.5.

13. The preform of claim 12, wherein the pigment has a refractive index which ranges from about 1.5 to about 2.3.

14. The preform of claim 13, wherein the pigment has a refractive index which ranges from about 1.7 to about 2.0.

15. The preform of claim 1, wherein the pigment has an anisotropic crystal structure.

16. The preform of claim 15, wherein the pigment has a triclinic structure.

17. The preform of claim 15, wherein the pigment has a monoclinic structure.

18. A container prepared by blow molding the preform of claim 1.

* * * * *